United States Patent

Murata et al.

[11] Patent Number: 6,042,782
[45] Date of Patent: Mar. 28, 2000

[54] WELDING MATERIAL FOR STAINLESS STEELS

[75] Inventors: Yoshiaki Murata, Amagasaki; Yuichi Komizo; Hiroyuki Hirata, both of Osaka, all of Japan

[73] Assignees: Sumikin Welding Industries Ltd., Hyogo; Sumitomo Metal Industries, Ltd., Osaka, both of Japan

[21] Appl. No.: 09/076,884

[22] Filed: May 13, 1998

Related U.S. Application Data

[63] Continuation of application No. PCT/JP97/03216, Sep. 11, 1997.

[30] Foreign Application Priority Data

Sep. 13, 1996 [JP] Japan ..................... 8-243482

[51] Int. Cl.[7] .................................. C22C 38/44
[52] U.S. Cl. .................. 420/109; 420/111; 420/115; 428/677; 219/146.23
[58] Field of Search ................ 420/109, 111, 420/115; 428/607, 677; 219/137 WM, 146.23

[56] References Cited

U.S. PATENT DOCUMENTS 4,816,085  3/1989  Flasche et al. .................... 420/52

FOREIGN PATENT DOCUMENTS

| | | |
|---|---|---|
| 58-93593 | 6/1983 | Japan . |
| 59-218295 | 12/1984 | Japan . |
| 1-95879 | 4/1989 | Japan . |
| 2-121800 | 5/1990 | Japan . |
| 3-86392 | 4/1991 | Japan . |
| 3-264194 | 11/1991 | Japan . |
| 5-132741 | 5/1993 | Japan . |
| 6-297187 | 10/1994 | Japan . |
| 8-57683 | 3/1996 | Japan . |
| 8-206877 | 8/1996 | Japan . |
| 8-260101 | 10/1996 | Japan . |

*Primary Examiner*—Deborah Yee
*Attorney, Agent, or Firm*—Armstrong, Westerman, Hattori, McLeland & Naughton

[57] ABSTRACT

A welding material for use in a consumable or non-consumable electrode welding of stainless steels, capable of forming a weld metal with excellent corrosion resistance and mechanical properties, being drawn into a welding wire easily. The welding material is a composite welding wire composed of a steel shell and a filler material enveloped by the said steel shell and not containing slag forming agent. The welding material, as a whole, has the chemical composition as follows (by weight %): Not more than 0.3% C, not more than 1.0% Si, not more than 1.5% Mn, not more than 0.04% P, not more than 0.01% S, not more than 0.5% Al, 8.0 to 10.0% Mo, 22.0 to 26.0% Cr, 2.0 to 5.0% Mo, 0.12 to 0.24% N, not more than 3.0% Co, not more than 5.0% W, not more than 2.0% Cu, not more than 1.5% V and the equivalent PREW of the welding material is not smaller than 42.0 and ferrite volume index Ph of the welding material is 0.12 to 0.25, in which PREW and Ph are defined by the following formula ① and formula ② respectively:

$$PREW = Cr + 3.3(Mo + 0.5W) + 16N \quad ①$$

$$Ph = \frac{Ni + 30(C + N) - 0.6(Cr + 1.5Si + Mo + 0.4W) + 5.6}{Cr + 1.5Si + Mo + 0.4W - 6} \quad ②$$

5 Claims, 13 Drawing Sheets

Fig.1

[TABLE 1] TYPES OF STEEL SHELL

| SHELL No | CHEMICAL COMPOSITION (wt.%, BAL.: Fe) | | | | | | | | | (NOTE) CORRESPONDING JIS |
|---|---|---|---|---|---|---|---|---|---|---|
| | C | Si | Mn | P | S | Ni | Cr | Mo | N | |
| 1 | 0.017 | 0.40 | 1.20 | 0.022 | 0.002 | 12.06 | 17.19 | 2.08 | 0.012 | SUS 316L |
| 2 | 0.014 | 0.33 | 1.79 | 0.017 | 0.002 | 10.39 | 18.73 | 0.01 | 0.014 | SUS 304L |
| 3 | 0.017 | 0.51 | 1.56 | 0.024 | 0.001 | 5.92 | 21.70 | 2.93 | 0.130 | SUS 329J3L |
| 4 | 0.010 | 0.09 | 0.34 | 0.013 | 0.011 | – | – | – | 0.003 | SPCC |

Fig.2

(TABLE 2)  CHEMICAL COMPOSITION OF WELDING MATERIAL (COMPOSITE WIRE)

| WELDING MATERIAL NO. | SHELL NO. | CHEMICAL COMPOSITION (wt.%, BAL.: Fe) | | | | | | | | | | | | | | | PREW |
|---|---|---|---|---|---|---|---|---|---|---|---|---|---|---|---|---|---|
| | | C | Si | Mn | P | S | Cu | Ni | Cr | Mo | W | Al | V | Co | N | O* | Pb | |
| 1 | 1 | 0.022 | 0.45 | 0.95 | 0.02 | 0.004 | 0.5 | 9.4 | 23.3 | 4.3 | 2.1 | — | — | — | 0.17 | — | 0.14 | 43.7 |
| 2 | 1 | 0.018 | 0.45 | 0.95 | 0.02 | 0.004 | — | 9.4 | 22.6 | 4.9 | 1.9 | 0.10 | — | — | 0.18 | — | 0.16 | 44.8 |
| 3 | 4 | 0.023 | 0.21 | 0.23 | 0.01 | 0.010 | 0.5 | 8.8 | 22.5 | 4.1 | 2.2 | 0.15 | — | — | 0.16 | — | 0.15 | 42.2 |
| 4 | 2 | 0.026 | 0.45 | 1.20 | 0.02 | 0.005 | 0.3 | 8.2 | 23.9 | 3.3 | 3.4 | — | 0.12 | 1.4 | 0.21 | — | 0.20 | 43.8 |
| 5 | 1 | 0.022 | 0.67 | 0.91 | 0.02 | 0.004 | — | 9.9 | 23.1 | 4.1 | 2.1 | 0.24 | 0.11 | — | 0.14 | — | 0.13 | 42.3 |
| 6 | 1 | 0.028 | 0.45 | 0.92 | 0.02 | 0.004 | 0.5 | 9.5 | 24.3 | 3.1 | 4.7 | 0.24 | — | — | 0.17 | — | 0.13 | 45.0 |
| 7 | 2 | 0.023 | 0.44 | 1.20 | 0.02 | 0.005 | 1.6 | 8.5 | 23.3 | 4.1 | 2.2 | — | 0.17 | — | 0.23 | — | 0.19 | 44.1 |
| 8 | 1 | 0.021 | 0.45 | 1.05 | 0.02 | 0.004 | 0.5 | 9.8 | 23.5 | 4.2 | 2.0 | — | — | — | 0.24 | — | 0.25 | 44.5 |
| 9 | 3 | 0.022 | 0.35 | 0.95 | 0.02 | 0.004 | 0.5 | 9.9 | 25.8 | 4.7 | — | — | — | — | 0.22 | — | 0.17 | 44.8 |
| 10 | 1 | 0.020 | 0.45 | 0.95 | 0.02 | 0.004 | 0.5 | <u>10.5</u> | 23.3 | 4.1 | 2.1 | — | — | — | 0.18 | — | 0.21 | 43.2 |
| 11 | 1 | 0.022 | 0.46 | 0.94 | 0.02 | 0.004 | — | 9.4 | 24.1 | 3.2 | 1.1 | — | 0.12 | — | 0.20 | — | 0.21 | <u>39.7</u> |
| 12 | 3 | 0.020 | 0.45 | 1.20 | 0.02 | 0.005 | 0.5 | 8.5 | 23.3 | 4.2 | 2.1 | — | — | 1.0 | <u>0.27</u> | — | 0.24 | 44.9 |
| 13 | 2 | 0.022 | 0.44 | 1.20 | 0.02 | 0.005 | 0.5 | 9.3 | 23.4 | 4.1 | 2.1 | — | 0.11 | — | 0.11 | — | <u>0.06</u> | 42.2 |
| 14 | 2 | 0.028 | 0.44 | 1.20 | 0.02 | 0.005 | 0.5 | 9.0 | 22.6 | 3.2 | <u>5.2</u> | — | — | — | 0.13 | — | <u>0.10</u> | 43.8 |
| 15 | 1 | 0.022 | 0.44 | 0.94 | 0.02 | 0.004 | — | 9.6 | 23.3 | 4.4 | 2.2 | <u>0.53</u> | 0.12 | — | 0.17 | — | 0.15 | 44.2 |
| 16 | 1 | 0.022 | 0.45 | 0.94 | 0.02 | 0.005 | 0.5 | 9.8 | <u>27.1</u> | 3.1 | 1.9 | — | 0.15 | — | 0.22 | — | 0.14 | 44.0 |
| 17 | 1 | 0.024 | 0.45 | 0.95 | 0.02 | 0.005 | 0.5 | 9.3 | 23.4 | 4.1 | 2.0 | — | — | — | 0.20 | <u>2.8</u> | 0.19 | 43.3 |

Rows 1–9: EXAMPLE OF THIS INVENTION
Rows 10–17: COMPARATIVE EXAMPLES

NOTE) 1. UNDERLINED VALUES ARE OUTSIDE THE SCOPE OF THIS INVENTION
2. O* REPRESENTS wt.% OF "OXYGEN IN OXIDES ADDED TO THE FILLER" TO TOTAL WIRE WEIGHT

Fig.3

[TABLE 3] WELDING CONDITIONS FOR MAKING RADIOGRAPHIC TEST SPECIMEN

| WELDING METHOD | MIG WELDING | | | TIG WELDING |
|---|---|---|---|---|
| WELDING POSITION | FLAT POSITION | VERTICAL POSITION | OVERHEAD POSITION | COMMON TO ALL POSITIONS |
| CURRENT (AMP) | 130~150 | 130~150 | 130~150 | 120~140 |
| VOLTAGE (VOLT) | 23~25 | 23~25 | 23~25 | 14~16 |
| TRAVELING SPEED (cm/min) | 15 | 10 | 15 | 10 |
| SHIELDING GAS | AR, 20 l/min | | | Ar, 20 l/min |
| WIRE DIAMETER | 1.2 mm φ | | | 1.2 mm φ |
| POLARITY | DC, EP | | | DC, EN |

Fig.4

[TABLE 4] CHEMICAL COMPOSITION AND TENSILE STRENGTH OF BASE METALS

| BASE METAL | TYPES OF STEELS | CHEMICAL COMPOSITION (wt.%, BAL.: Fe) | | | | | | | | | | TENSILE STRENGTH (MPa) |
|---|---|---|---|---|---|---|---|---|---|---|---|---|
| | | C | Si | Mn | P | S | Cu | Ni | Cr | Mo | W | N | |
| A | SUPER DUPLEX STAINLESS STEEL | 0.013 | 0.34 | 0.55 | 0.022 | 0.001 | 0.51 | 6.84 | 24.82 | 3.15 | 2.01 | 0.307 | 872 |
| B | MARTENSITIC STAINLESS STEEL | 0.008 | 0.31 | 0.43 | 0.018 | 0.001 | — | 6.20 | 12.02 | 2.51 | Ti:07 | 0.004 | 880 |

Fig.5

[TABLE 5] RADIOGRAPHIC TEST RESULTS

| | TEST NO. | WELDING METHOD | WELDING MATERIAL NO. | WELDING POSITION | | |
|---|---|---|---|---|---|---|
| | | | | FLAT POSITION | VERTICAL POSITION | OVERHEAD POSITION |
| EXAMPLES OF THIS INVENTION | MA1 | MIG | 1 | GRADE 1 | GRADE 1 | GRADE 1 |
| | TA1 | TIG | 1 | GRADE 1 | GRADE 1 | GRADE 1 |
| | MA2 | MIG | 2 | GRADE 1 | GRADE 1 | GRADE 1 |
| | TA2 | TIG | 2 | GRADE 1 | GRADE 1 | GRADE 1 |
| | MA3 | MIG | 3 | GRADE 1 | GRADE 1 | GRADE 1 |
| | TA3 | TIG | 3 | GRADE 1 | GRADE 1 | GRADE 1 |
| | MA4 | MIG | 4 | GRADE 1 | GRADE 1 | GRADE 1 |
| | TA4 | TIG | 4 | GRADE 1 | GRADE 1 | GRADE 1 |
| | MA5 | MIG | 5 | GRADE 1 | GRADE 1 | GRADE 1 |
| | TA5 | TIG | 5 | GRADE 1 | GRADE 1 | GRADE 1 |
| | MA6 | MIG | 6 | GRADE 1 | GRADE 1 | GRADE 1 |
| | TA6 | TIG | 6 | GRADE 1 | GRADE 1 | GRADE 1 |
| | MA7 | MIG | 7 | GRADE 1 | GRADE 1 | GRADE 1 |
| | TA7 | TIG | 7 | GRADE 1 | GRADE 1 | GRADE 1 |
| | MA8 | MIG | 8 | GRADE 1 | GRADE 1 | GRADE 1 |
| | TA8 | TIG | 8 | GRADE 1 | GRADE 1 | GRADE 1 |
| | MA9 | MIG | 9 | GRADE 1 | GRADE 1 | GRADE 1 |
| | TA9 | TIG | 9 | GRADE 1 | GRADE 1 | GRADE 1 |
| COMPARATIVE EXAMPLES | MA10 | MIG | 10 | GRADE 1 | GRADE 1 | GRADE 1 |
| | TA10 | TIG | 10 | GRADE 1 | GRADE 1 | GRADE 1 |
| | MA11 | MIG | 11 | GRADE 1 | GRADE 1 | GRADE 1 |
| | TA11 | TIG | 11 | GRADE 1 | GRADE 1 | GRADE 1 |
| | MA12 | MIG | 12 | GRADE 3 | GRADE 2 | GRADE 4 |
| | TA12 | TIG | 12 | GRADE 2 | GRADE 2 | GRADE 4 |
| | MA13 | MIG | 13 | GRADE 1 | GRADE 1 | GRADE 1 |
| | TA13 | TIG | 13 | GRADE 1 | GRADE 1 | GRADE 1 |
| | MA14 | MIG | 14 | GRADE 1 | GRADE 1 | GRADE 1 |
| | TA14 | TIG | 14 | GRADE 1 | GRADE 1 | GRADE 1 |
| | MA15 | MIG | 15 | GRADE 1 | GRADE 1 | GRADE 1 |
| | TA15 | TIG | 15 | GRADE 1 | GRADE 1 | GRADE 1 |
| | MA16 | MIG | 16 | GRADE 1 | GRADE 1 | GRADE 1 |
| | TA16 | TIG | 16 | GRADE 1 | GRADE 1 | GRADE 1 |
| | MA17 | MIG | 17 | GRADE 1 | GRADE 1 | GRADE 1 |
| | TA17 | TIG | 17 | GRADE 1 | GRADE 1 | GRADE 1 |

Fig.6

CONDITIONS FOR MAKING SPECIMENS FOR
[TABLE 6] TESTING PROPERTIES OF THE WELD METAL

| WELDING METHOD | MIG WELDING | TIG WELDING |
|---|---|---|
| CURRENT (AMP) | 160~180 | 120~150 |
| VOLTAGE (VOLT) | 26~28 | 14~17 |
| TRAVELLING SPEED (cm/min) | 25~35 | 10 |
| SHIELDING GAS | Ar, 20 l/min | Ar, 20 l/min |
| WIRE DIAMETER | 1.2 mmφ | 1.2 mmφ |
| POLARITY | DC, EP | DC, EN |
| PREHEATING | NONE (ROOM TEMP.) | NONE (ROOM TEMP.) |
| INTERPASS TEMPERATURE | NOT HIGHER THAN 150°C | NOT HIGHER THAN 150°C |

Fig.7

[TABLE 7] CHEMICAL COMPOSITIONS OF THE WELD METALS (PART-1)

| Joint No. | Welding Material No. | Base Metal | Welding Method | C | Si | Mn | P | S | Cu | Ni | Cr | Mo | W | sol.Al | V | Co | N | O |
|---|---|---|---|---|---|---|---|---|---|---|---|---|---|---|---|---|---|---|
| MDJ1 | 1 | A | MIG | 0.023 | 0.43 | 0.92 | 0.02 | 0.004 | 0.5 | 9.3 | 23.0 | 4.1 | 2.1 | — | — | — | 0.16 | 0.05 |
| MDJ2 | 2 | A | MIG | 0.019 | 0.44 | 0.94 | 0.02 | 0.004 | — | 9.4 | 22.4 | 4.7 | 1.9 | 0.01 | — | — | 0.17 | 0.05 |
| MDJ3 | 3 | A | MIG | 0.024 | 0.20 | 0.21 | 0.01 | 0.010 | 0.5 | 8.8 | 22.3 | 4.0 | 2.2 | 0.02 | — | — | 0.15 | 0.05 |
| MDJ4 | 4 | A | MIG | 0.028 | 0.43 | 1.16 | 0.02 | 0.005 | 0.3 | 8.1 | 23.5 | 3.1 | 3.3 | — | 0.12 | 1.4 | 0.20 | 0.05 |
| MDJ5 | 5 | A | MIG | 0.023 | 0.65 | 0.90 | 0.02 | 0.004 | — | 9.9 | 23.0 | 4.0 | 2.1 | 0.02 | 0.11 | — | 0.13 | 0.04 |
| MDJ6 | 6 | A | MIG | 0.030 | 0.44 | 0.91 | 0.02 | 0.004 | 0.5 | 9.5 | 24.1 | 3.0 | 4.7 | 0.02 | — | — | 0.16 | 0.04 |
| MDJ7 | 7 | A | MIG | 0.024 | 0.42 | 1.15 | 0.02 | 0.005 | 1.5 | 8.4 | 23.0 | 4.0 | 2.2 | — | 0.17 | — | 0.21 | 0.05 |
| MDJ8 | 8 | A | MIG | 0.022 | 0.43 | 1.02 | 0.02 | 0.004 | 0.5 | 9.6 | 23.1 | 4.0 | 2.0 | — | — | — | 0.22 | 0.05 |
| MDJ9 | 9 | A | MIG | 0.023 | 0.33 | 0.92 | 0.02 | 0.004 | 0.5 | 9.8 | 25.0 | 4.5 | — | — | — | — | 0.20 | 0.05 |
| TDJ1 | 1 | A | TIG | 0.022 | 0.44 | 0.94 | 0.02 | 0.003 | 0.5 | 9.4 | 23.2 | 4.1 | 2.1 | — | — | — | 0.16 | 0.01 |
| TDJ4 | 4 | A | TIG | 0.025 | 0.44 | 1.18 | 0.02 | 0.004 | 0.3 | 8.2 | 23.7 | 3.2 | 3.3 | — | 0.12 | 1.4 | 0.20 | 0.01 |
| TDJ9 | 9 | A | TIG | 0.020 | 0.33 | 0.92 | 0.02 | 0.004 | 0.5 | 9.9 | 25.6 | 4.5 | — | — | — | — | 0.21 | 0.01 |
| MMJ1 | 1 | B | MIG | 0.022 | 0.43 | 0.91 | 0.02 | 0.004 | 0.5 | 9.3 | 22.8 | 4.1 | 2.1 | — | — | — | 0.16 | 0.04 |
| MMJ4 | 4 | B | MIG | 0.029 | 0.41 | 1.15 | 0.02 | 0.005 | 0.3 | 8.1 | 23.5 | 3.1 | 3.3 | — | 0.12 | 1.4 | 0.19 | 0.05 |
| MMJ9 | 9 | B | MIG | 0.023 | 0.33 | 0.93 | 0.02 | 0.004 | 0.5 | 9.7 | 25.1 | 4.4 | — | — | — | — | 0.20 | 0.04 |
| TMJ1 | 1 | B | TIG | 0.023 | 0.44 | 0.91 | 0.02 | 0.004 | 0.5 | 9.4 | 23.3 | 4.2 | 2.0 | — | — | 1.4 | 0.17 | 0.01 |
| TMJ4 | 4 | B | TIG | 0.023 | 0.42 | 1.18 | 0.02 | 0.004 | 0.3 | 8.1 | 23.8 | 3.3 | 3.1 | — | 0.11 | — | 0.19 | 0.01 |
| TMJ9 | 9 | B | TIG | 0.021 | 0.31 | 0.92 | 0.02 | 0.003 | 0.5 | 9.8 | 25.1 | 4.5 | — | — | — | — | 0.20 | 0.01 |

CHEMICAL COMPOSITIONS OF THE WELD METALS (wt.%, BAL.: Fe)

Rows MDJ1–MDJ9: EXAMPLES OF THIS INVENTION (1)
Rows TDJ1–TMJ9: EXAMPLES OF THIS INVENTION (2)

Fig. 8

[TABLE 8] CHEMICAL COMPOSITIONS OF THE WELD METALS (PART-2)

| | JOINT NO. | WELDING MATERIAL NO. | BASE METAL | WELDING METHOD | C | Si | Mn | P | S | Cu | Ni | Cr | Mo | W | sol.Al | V | Co | N | O |
|---|---|---|---|---|---|---|---|---|---|---|---|---|---|---|---|---|---|---|---|
| COMPARATIVE EXAMPLES (1) | MDJ10 | 10 | A | MIG | 0.021 | 0.43 | 0.93 | 0.02 | 0.004 | 0.5 | 10.4 | 23.0 | 3.9 | 2.1 | | | | 0.17 | 0.05 |
| | MDJ11 | 11 | A | MIG | 0.022 | 0.42 | 0.92 | 0.02 | 0.004 | | 9.3 | 23.7 | 3.1 | 1.1 | | 0.12 | | 0.19 | 0.05 |
| | MDJ12 | 12 | A | MIG | 0.022 | 0.44 | 1.16 | 0.02 | 0.005 | 0.5 | 8.4 | 23.0 | 4.0 | 2.1 | | | 1.0 | 0.25 | 0.05 |
| | MDJ13 | 13 | A | MIG | 0.023 | 0.42 | 1.15 | 0.02 | 0.005 | 0.5 | 9.2 | 23.0 | 3.9 | 2.1 | | 0.11 | | 0.10 | 0.05 |
| | MDJ14 | 14 | A | MIG | 0.032 | 0.43 | 1.16 | 0.02 | 0.005 | 0.5 | 8.9 | 22.3 | 3.1 | 5.1 | | | | 0.12 | 0.05 |
| | MDJ15 | 15 | A | MIG | 0.023 | 0.44 | 0.94 | 0.02 | 0.004 | | 9.6 | 23.2 | 4.3 | 2.2 | 0.05 | 0.12 | | 0.16 | 0.04 |
| | MDJ16 | 16 | A | MIG | 0.023 | 0.43 | 0.92 | 0.02 | 0.005 | 0.5 | 9.7 | 26.7 | 3.0 | 1.9 | | 0.15 | | 0.21 | 0.05 |
| | MDJ17 | 17 | A | MIG | 0.020 | 0.40 | 0.91 | 0.02 | 0.005 | 0.5 | 10.0 | 24.1 | 4.2 | 2.0 | | | | 0.19 | 0.14 |
| COMPARATIVE EXAMPLES (2) | TDJ11 | 11 | A | TIG | 0.020 | 0.44 | 0.92 | 0.02 | 0.004 | 0.5 | 9.4 | 24.0 | 3.1 | 1.0 | | 0.11 | | 0.19 | 0.01 |
| | TDJ13 | 13 | A | TIG | 0.020 | 0.44 | 1.19 | 0.02 | 0.005 | 0.5 | 9.2 | 23.2 | 4.1 | 2.0 | | 0.10 | | 0.10 | 0.01 |
| | TDJ17 | 17 | A | TIG | 0.022 | 0.43 | 0.94 | 0.02 | 0.004 | 0.5 | 9.2 | 23.3 | 4.1 | 1.8 | | | | 0.18 | 0.13 |
| | MMJ13 | 13 | B | MIG | 0.024 | 0.41 | 1.11 | 0.02 | 0.005 | 0.5 | 9.3 | 23.1 | 4.0 | 1.9 | | 0.10 | | 0.09 | 0.05 |
| | MMJ17 | 17 | B | MIG | 0.022 | 0.41 | 0.92 | 0.02 | 0.004 | 0.5 | 9.1 | 23.1 | 3.9 | 1.9 | | | | 0.18 | 0.16 |
| | TMJ13 | 13 | B | TIG | 0.019 | 0.44 | 1.15 | 0.02 | 0.004 | 0.5 | 9.3 | 23.0 | 4.1 | 2.0 | | 0.11 | | 0.10 | 0.01 |
| | TMJ17 | 17 | B | TIG | 0.023 | 0.44 | 0.92 | 0.02 | 0.005 | 0.5 | 9.3 | 23.1 | 4.0 | 1.9 | | | | 0.19 | 0.14 |

TOTAL CHEMICAL COMPOSITIONS OF THE WELD METALS (wt.%, BAL.: Fe)

Fig.9

[TABLE 9] TEST RESULTS OF WELDED JOINT PROPERTIES (PART-1)

| | JOINT NO. | WELDING MATERIAL NO. | BASE METAL | WELDING METHOD | RESULTS OF TENSILE TEST Ts(MPa) | RESULTS OF TENSILE TEST FRACTURE POINT | IMPACT VALUE ($J/cm^2$) WELD METAL | IMPACT VALUE ($J/cm^2$) FUSION LINE | RESULTS OF PITTING CORROSION TEST | RESULTS OF SSC TEST |
|---|---|---|---|---|---|---|---|---|---|---|
| EXAMPLES OF THIS INVENTION (1) | MDJ1 | 1 | A | MIG | 871 | BASE METAL | 88 | 185 | ○ | — |
| | MDJ2 | 2 | A | MIG | 872 | BASE METAL | 85 | 179 | ○ | — |
| | MDJ3 | 3 | A | MIG | 872 | BASE METAL | 84 | 182 | ○ | — |
| | MDJ4 | 4 | A | MIG | 872 | BASE METAL | 85 | 172 | ○ | — |
| | MDJ5 | 5 | A | MIG | 872 | BASE METAL | 81 | 196 | ○ | — |
| | MDJ6 | 6 | A | MIG | 871 | BASE METAL | 82 | 168 | ○ | — |
| | MDJ7 | 7 | A | MIG | 871 | BASE METAL | 86 | 180 | ○ | — |
| | MDJ8 | 8 | A | MIG | 870 | BASE METAL | 83 | 175 | ○ | — |
| | MDJ9 | 9 | A | MIG | 872 | BASE METAL | 81 | 166 | ○ | — |
| EXAMPLES OF THIS INVENTION (2) | TDJ1 | 1 | A | TIG | 872 | BASE METAL | 99 | 175 | ○ | — |
| | TDJ4 | 4 | A | TIG | 870 | BASE METAL | 96 | 162 | ○ | — |
| | TDJ9 | 9 | A | TIG | 872 | BASE METAL | 98 | 189 | ○ | — |
| | MMJ1 | 1 | B | MIG | 879 | BASE METAL | 88 | 122 | — | ○ |
| | MMJ4 | 4 | B | MIG | 880 | BASE METAL | 86 | 130 | — | ○ |
| | MMJ9 | 9 | B | MIG | 880 | BASE METAL | 85 | 125 | — | ○ |
| | TMJ1 | 1 | B | TIG | 878 | BASE METAL | 101 | 136 | — | ○ |
| | TMJ4 | 4 | B | TIG | 880 | BASE METAL | 98 | 125 | — | ○ |
| | TMJ9 | 9 | B | TIG | 879 | BASE METAL | 100 | 126 | — | ○ |

NOTE) —: NOT CARRIED OUT, ○: ACCEPTABLE

Fig.10

[TABLE 10] TEST RESULTS OF WELDED JOINT PROPERTIES (PART-2)

| JOINT NO. | WELDING MATERIAL NO. | BASE METAL | WELDING METHOD | RESULTS OF TENSILE TEST Ts(MPa) | RESULTS OF TENSILE TEST FRACTURE POINT | IMPACT VALUE (J/cm²) WELD METAL | IMPACT VALUE (J/cm²) FUSION LINE | RESULTS OF PITTING CORROSION TEST | RESULTS OF SSC TEST | |
|---|---|---|---|---|---|---|---|---|---|---|
| MDJ10 | 10 | A | MIG | 872 | BASE METAL | 43 | 144 | ○ | — | \\multirow{7}{*}{COMPARATIVE EXAMPLES (1)} |
| MDJ11 | 11 | A | MIG | 871 | BASE METAL | 86 | 175 | × | — | |
| MDJ12 | 12 | A | MIG | 870 | BASE METAL | 86 | 180 | — | — | |
| MDJ13 | 13 | A | MIG | 870 | BASE METAL | 46 | 149 | × | — | |
| MDJ14 | 14 | A | MIG | 871 | BASE METAL | 56 | 150 | × | — | |
| MDJ15 | 15 | A | MIG | 872 | BASE METAL | 47 | 151 | ○ | — | |
| MDJ16 | 16 | A | MIG | 872 | BASE METAL | 33 | 131 | ○ | — | |
| MDJ17 | 17 | A | MIG | 870 | BASE METAL | 23 | 125 | × | — | |
| TDJ11 | 11 | A | TIG | 871 | BASE METAL | 101 | 184 | × | — | COMPARATIVE EXAMPLES (2) |
| TDJ13 | 13 | A | TIG | 872 | BASE METAL | 67 | 164 | × | — | |
| TDJ17 | 17 | A | TIG | 872 | BASE METAL | 35 | 155 | × | — | |
| MMJ13 | 13 | B | MIG | 880 | BASE METAL | 40 | 118 | — | ○ | |
| MMJ17 | 17 | B | MIG | 880 | BASE METAL | 31 | 120 | — | ○ | |
| TMJ13 | 13 | B | TIG | 879 | BASE METAL | 63 | 125 | — | ○ | |
| TMJ17 | 17 | B | TIG | 880 | BASE METAL | 42 | 116 | — | ○ | |

NOTE) — : NOT CARRIED OUT, ○: ACCEPTABLE, × : NOT ACCEPTABLE

WELDING MATERIAL FOR STAINLESS STEELS

This application is a continuation of international application PCT/JP97/03216 filed Sep. 11, 1997.

TECHNICAL FIELD

This invention relates to a welding material for stainless steels, and more particularly relates to a welding material capable of forming a clean weld metal with high corrosion resistance and high mechanical properties, such as tensile strength and toughness, in all positions welding. This invention also relates to a welding material suitable for use in welding duplex stainless steel or martensitic stainless steel, by means of the gas shield arc welding method.

BACKGROUND ART

Stainless steels are usually welded by using welding materials with a chemical composition fundamentally the same as that of the base stainless steel. In doing so, some problems regarding a depression of mechanical properties and corrosion resistance of the weld metal may arise due to types of the base metal. For example, in an operation of welding a martensitic stainless steel, containing 9 to 14% chromium (hereinafter "%" means "weight %" for any alloying component), using the welding materials with the same composition as that of the base metal, the weld metal is too hard and not able to exhibit the desired level of toughness, which causes sometimes inferior resistance to stress corrosion cracking, depending on the circumstances.

In order to solve these problems, some inventions were proposed and disclosed in Japanese Patent Public Disclosure No.8-57683 and International Patent Public Disclosure WO97/12072, each being characterized by welding base metals of martensitic stainless steel, with a welding material of duplex stainless steel that consists of austenite and ferrite.

On the other hand, some novel types of stainless steels, as the base metals, have been recently developed. However, any welding material suitable for use in welding these base metals has not yet been developed. Among these new types of stainless steels, there is one named "super duplex stainless steel".

Since the austenite-ferrite duplex stainless steel (JIS SUS329 and the like) exhibits high corrosion resistance, toughness and strength, it has been extensively used in structural materials which shall be exposed to the severe corrosive circumstance.

Early duplex stainless steels, in other words the first generations of duplex stainless steels, were defective regarding both workability and weldability. Then, the defects were overcome by adding nitrogen etc. Thus improved stainless steels might be called the second generations of duplex stainless steels, and they are applicable for wider uses. For example, in recent years, petroleum resources have become gradually exhausted, and most oil wells can be found at locations of severer conditions, wherein materials OCTG and line pipes are required to have more excellent corrosion resistance, higher toughness and the other mechanical properties. In order to meet such requirements, further new duplex stainless steels with higher content of nitrogen or other alloying elements have been developed. Those stainless steels are called "super duplex stainless steels", and are now drawing the attention.

These duplex stainless steels are generally welded with welding materials having the chemical composition similar to that of the base stainless steels. This means that the nitrogen content of the welding material is increased in accordance with the grade of the base stainless steels. In Japanese Patent Application No.7-60523 (Japanese Patent Public Disclosure 8-260101), the applicant of this application has already proposed a welding material for a duplex stainless steel, which contains 24 to 26% chromium, 2.0 to 3.3% molybdenum, 1.5 to 5% tungsten and a high level nitrogen of 0.24 to 0.35%. The welding material is a solid wire and made of a duplex stainless steel with the composition similar to that of the base steel. With using this welding wire, both the pitting corrosion resistance and toughness of the weld metal can be improved remarkably.

The welding wire with such a high nitrogen content is applicable to tungsten inert gas welding method (hereinafter designated as TIG), but not always applicable to consumable electrode welding method, e g., metal inert gas welding method (hereinafter designated as MIG), since welding defects called "blowholes" are apt to be produced. Particularly, the blowhole defects are often produced in the overhead position welding in comparison to other positions welding. Therefore, it is doubtful whether the welding wire made of a duplex stainless steel, with such high nitrogen content, is applicable to MIG in all positions welding.

Regarding the solid welding wire, having a composition similar to that of the base metal of the duplex stainless steel with high nitrogen content, there is another problem as follows.

The duplex stainless steel contains large amounts of chromium, molybdenum and other alloying elements, which are effective to increase corrosion resistance, such as resistance to pitting corrosion. These alloying elements accelerate precipitation of hard and brittle intermetallic compounds ($\sigma$ phase) in the matrix, and wire drawing operation of the duplex stainless steel becomes difficult. This means that a production of duplex stainless steel welding wire and also its stable supply to customers are difficult.

In addition to the above-mentioned MIG using a solid welding wire, there is another gas shield arc welding method, using consumable electrode, in which a flux-cored wire (composite wire) is used. Since the flux cored wire envelops slag forming agents other than alloying elements. It has various advantages such as little sputter generation and favorable bead formation.

However, in case of welding metals with conventional flux cored welding wire, cleanness of the weld metal is far inferior to that of the weld metal formed by the other welding method. The inferior cleanness has been a barrier to an improvement of the toughness and pitting corrosion resistance of the weld metal. The reason for the poor cleanness of the weld metal during the welding operation is based on the fact that a part of slag forming agents, most of which are oxides, remains in the weld metal as non-metallic inclusions.

Japanese Patent Publication No.8-25062 discloses a flux cored welding wire for use in welding a stainless steel, which forms little amounts of slag during welding operation. This flux cored welding wire, however, was developed so as to simplify a sequence of welding operations or eliminate any one of operation steps, e.g., a slag-removing step. Accordingly, this welding wire is not suitable for use in welding the duplex stainless steels, in particular, the super duplex stainless steels.

As particularly mentioned above, any consumable electrode welding material for use in welding the super duplex stainless steels, which is capable of forming sound weld metal in all welding positions, have not been developed yet. At present, only a solid wire, having the composition similar to that of the base metal, and being applicable to the TIG welding, is produced.

The invention, which is disclosed in the above-mentioned Japanese Patent Public Disclosure No.8-57683, relates to a method of welding martensitic stainless steel using a filler metal of duplex stainless steel. The composition of the filler metal to be used in this method is restricted in view of ensuring the grade of mechanical properties and corrosion resistances of the weld metal. The above-mentioned problems regarding manufacture of the welding wire, generation of blowholes during welding operation and the poor cleanness of the welding metal, have not been solved. The situation is the same for the invention of above-mentioned international patent public disclosure WO97/12072. Although it is a good idea to weld martensitic stainless steels using a welding material of the duplex stainless steel, the welding material has not yet been fully improved in order to substantiate the idea.

DISCLOSURE OF THE INVENTION

The object of this invention is to provide a welding material, which satisfies all of following conditions (i) to (v).

(i) Capable of forming a weld metal with excellent corrosion resistances and mechanical properties when applied to the welding of any type of stainless steel including duplex stainless steel and martensitic stainless steel.

(ii) Applicable to both non-consumable electrode welding method, e.g., TIG and consumable electrode welding method, e. g., MIG and MAG (metal active gas welding) method.

(iii) Not causing any welding defects such as blowholes in all positions TIG welding including flat position, vertical position and overhead position, dealing with in consideration of automatic and circulating welding of horizontally laid line pipes.

(iv) Capable of forming a weld metal which is cleaner than that formed by the conventional flux cored wire, and exhibits excellent corrosion resistance and toughness which are well comparable with that of the welding material of Japanese Patent Application No. 7-60523 (Japanese Patent Public Disclosure 8-260101)

(v) Capable of producing composite wires easier than drawing the conventional super duplex stainless steel into solid wires.

The features of the welding material for stainless steels according to this invention are as follows:

(1) The welding material of this invention belongs to a type of the composite wire (cored wire) composed of a steel shell and filler material enveloped by the shell. The filler material does not include any slag-forming agent.

(2) The welding wire, as a whole of the shell steel and filler material cored therein, consists of not more than 0.03% C, not more than 1.0% Si, not more than 1.5% Mn, not more than 0.04% P, not more than 0.01% S, not more than 0.5% Al, 8.0 to 10.0% Ni, 22.0 to 26.0% Cr, 2.0 to 5.0% Mo, 0.12 to 0.24% N, not more than 3.0% Co, not more than 5.0% W, not more than 2.0% Cu, not more than 1.50% V, and the balance being Fe and incidental impurities.

(3) In the composition range, as shown in above item (2), the welding material has "pitting resistance equivalent" PREW of not smaller than 42.0 and "ferrite volume index" Ph from 0.12 to 0.25. The PREW and Ph are defined by the following formulas ① and ② respectively.

$$PREW = Cr + 3.3(Mo + 0.5W) + 16N \quad \text{①}$$

$$Ph = \frac{Ni + 30(C + N) - 0.6(Cr + 1.5Si + Mo + 0.4W) + 5.6}{Cr + 1.5Si + Mo + 0.4W - 6} \quad \text{②}$$

wherein each symbol of an element indicates the content (weight %) of the element.

The chemical composition of the whole welding material, or the composite wire, is determined in the following manner. Now supposing that the content of any element A in the composite wire is Cw % (as herein-before described, "%" means "weight %" for any alloying element), the content of the element A in the steel shell is Ch % the content of the element A in the filler material is Cf %, and a filling ratio of filter material (a ratio of filler material weight to the total wire weight) is FR, $$Cw=(1-FR) \times Ch+FR \times Cf \quad \text{③}$$

BRIEF DESCRIPTION OF DRAWINGS

FIG. 2 is a table showing total chemical compositions of composite wires used in examples.

FIG. 7 is a table showing chemical compositions of the weld metals made of the welding materials of the examples of this invention shown in the FIG. 2.

FIGS. 11(*a*) to 11(*c*) illustrate examples of lateral cross section of the welding material (composite wire) according to this invention.

FIGS. 14(*a*) and 14(*b*) are illustrations showing specifications for machining an impact test specimen out of the weld joints.

FIGS. 15(*a*) to 15(*f*) are illustrations showing a direction for machining a tensile test specimen, a pitting corrosion test specimen and a sulfide stress corrosion cracking test specimen out of the weld joints.

BEST MODE OF CARRYING OUT THE INVENTION

Figure 11A:
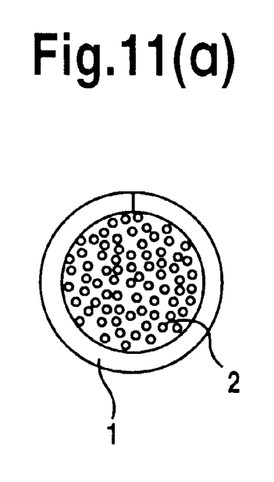
Figure 11B:
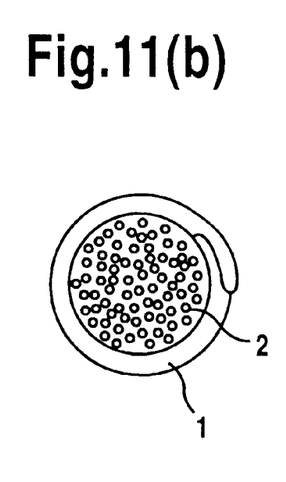
Figure 11C:
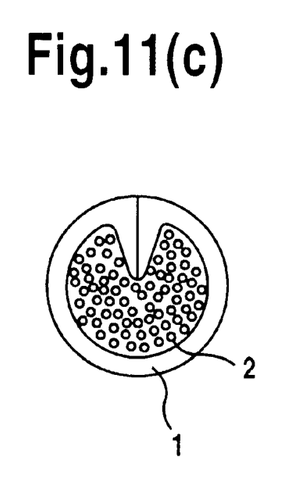

The welding material, i.e., composite wire, of this invention, consists of shell 1 and filler material 2, as its lateral cross section is shown in FIG. 11. The shell 1 can be made of any type of steel, such as carbon steel or stainless steel (including ferritic, austenitic, and duplex stainless steels). In principle, the steel is not restricted to a particular type. However, the steel should have good cold workability, since it is necessary to shape it into the shell of the composite wire.

The filler material 2 is powdery and enveloped in a steel strip to be the shell 1. A composite raw wire thus manufactured is then drawn into the composite wire product, similar to the usual flux cored wire. The cross section of the welding wire can be selected from the shape (a), (b), (c) or the like, as shown in FIG. 11.

The welding material of this invention can be applied to either consumable electrode type welding method or non-consumable electrode type welding method. TIG and MIG welding methods, as the typical examples of the former and latter methods respectively will be explained below.

This invention is intended to provide a welding material exhibiting whole of properties (i) to (v) as mentioned above. For this purpose, the welding material is designed as follows.

At first, in order to ensure the predetermined level of mechanical properties and that of corrosion resistance, a content of each alloying element, pitting resistance equivalent PREW as indicated by aforesaid formula ① and ferrite volume index Ph as indicated by aforesaid formula ② are respectively restricted in the desired ranges. In particular, nitrogen content, which produces blowholes in the weld metal, is restricted to the minimum necessary level. Thus, the sound weld metal can be obtained in all welding positions by either TIG or MIG welding method. The reduction of the pitting corrosion resistance in the austenitic phase, due to the restriction of the nitrogen content, is compensated by setting the above-mentioned ferrite volume index Ph, designated by formula ②, in a lower level than usual.

In the second phase, the conventional slag forming agents are not added to the filler material of the composite welding wire of this invention, though it was the usual practice to add them to the filler. Thus, inclusions composed mainly of oxides are not formed in the weld metal, and the worsening of the cleanness of the weld metal can be avoided. Consequently, either TIG or MIG welding method can obtain a weld metal with fundamentally improved properties, such as corrosion resistance and tensile strength and toughness.

The welding material of this invention is formed into a composite wire from the standpoint of ease of its manufacturing. The solid welding wire itself is required to have the strict composition similar to that of the base metal of the duplex stainless steel or martensitic stainless steel. That is to say, these stainless steels must have such good cold workability as to be formed into the wire. However, it is very difficult to keep their favorable cold workability through the wire drawing operation. On the other hand, the composite welding wire is able to adjust its total composition to be similar to that of the base metal by putting the shell and the core together. That is to say, the shell is allowed to have a composition in wider range compared with the case of the solid welding wire. This means that any type of steel with good workability can be used as the shell, resulting in an easy manufacturing of the welding wire.

As particularly mentioned above, carbon steels (mild steel with low carbon content is preferable) and various types of stainless steels can be used in forming the shell. By adjusting the composition of the filler material and its filling rate in accordance with the composition of the shell, the desired chemical composition of the composite welding wire, as the whole, can be obtained. That is to say, a composite wire, having the total composition in accordance with that of the base metal of duplex stainless steel or martensitic stainless steel, can be easily obtained. Some examples of such steel types, for use in the shell, are shown below:

Carbon steel . . . SPCC in JIS 3141, etc.
Ferritic stainless steel . . . SUS 410L in JIS G 4305, etc
Austenitic stainless steel . . . SUS 316L, SUS 304L in JIS G 4305, etc.
Duplex stainless steel . . . SUS 329J3 in JIS G 4305, etc.

The filler material is a mixture of various kinds of metal powders and/or alloy powders compounded to make the foregoing total composition together with the shell steel. The grain size of the powder is preferably about 150 $\mu$m or less.

Now, the technical reasons for restricting the content of each alloying element of the welding material (composite welding wire) of this invention will be described in detail, wherein the content stands for the total content (a sum of the content of the shell steel and that of the cored filler material) as calculated by the foregoing formula ③.

Carbon

An excessive amount of carbon precipitates as the carbides and consumes chromium and other functional alloying elements and lowers their effective contents. Accordingly, the carbon content should be not more than 0.03%, and it is preferable to be as low as possible.

Silicon

Although silicon is a useful element as a deoxidizing agent, it is detrimental to the toughness of the weld metal. In particular, more than 1.0% silicon content accelerates a production of intermetallic compounds ($\sigma$ phase, etc) and lowers the corrosion resistance and toughness of the weld metal. The silicon content is therefore restricted in a range from an impurity level to 1.0%, and preferably 0.1 to 1.0% for ensuring its deoxidizing effect.

Manganese

Manganese is an effective deoxidizing element and increases solubility of nitrogen in the weld metal. More than 1.5% manganese unfavorably lowers the corrosion resistance and toughness of the weld metal. The manganese content is therefore restricted in a range from an impurity level to 1.5%, and preferably 0.1 to 1.5% for ensuring its deoxidizing effect.

Phosphorus

Phosphorus is unavoidably brought from the steel making materials and remains in the product steel as an impurity thereof. It is preferable to keep the phosphorus content as low as possible, but the maximum allowable content is 0.04%. More than 0.04% phosphorus content lowers the pitting corrosion resistance and toughness and increases the sensitivity to high temperature cracking.

Sulfur

Sulfur, similar to phosphorus, is unavoidably brought from the steel making materials and remains in the product steel as an impurity. More than 0.01% sulfur lowers the pitting corrosion resistance and increases the sensitivity to high temperature cracking. The sulfur content is therefore restricted to not more than 0.01%, and it is preferable to keep it as low as possible.

Aluminum

Aluminum is generally used as a deoxidizing agent, but it is not intentionally added to the welding material of this invention. Since aluminum is a strong ferrite-stabilizing element, an excess amount of aluminum brings about an excess amount of ferrite phase in the weld metal, thus resulting in the lowering of the toughness thereof. In addition to that, aluminum is easily oxidized and forms an oxide film with inferior electric conductivity on the bead surface, it makes the welding arc unstable. Such an oxide film must be removed at every welding pass, which requires additional time-consuming operations. Such disadvantages caused by the addition of aluminum become distinctive with more than 0.5% aluminum content. The aluminum content is therefore restricted to not more than 0.5% and it is preferable to keep it as low as possible.

Nickel

Nickel is an austenite-stabilizing element and suppresses a formation of ferrite phase in the weld metal. Such a function can be exhibited with more than 8.0% nickel content. Whereas more than 10.0% nickel promotes the precipitation of σ phase, in the course of welding operations, and this has a bad influence on the toughness of the weld metal. The nickel content is therefore restricted in a range of 8.0 to 10.0%.

Chromium

In order to ensure the sufficient corrosion resistance of the duplex stainless steel, at least 22.0% chromium content is necessary. However, more than 26.0% chromium promotes a precipitation of intermetallic compounds, e.g., σ phase, and greatly lowers the toughness of the steel. Therefore, the chromium content should be in a range of 22.0 to 26.0%, and preferably 22.5 to 24.5%.

Molybdenum

Molybdenum is an element that increases the pitting corrosion resistance in a chloride-containing environment and, on the other hand, distinctively promotes a precipitation of σ phase. A suitable amount of molybdenum increases the pitting corrosion resistance of the weld metal, without promoting the precipitation of σ phase, in a short heating cycle such as the welding heat cycle, which is given to the steel. That is to say the addition of molybdenum is capable of increasing the pitting resistance equivalent (PREW), as shown by the above-mentioned formula ①, in case of reducing chromium content and nitrogen content. An addition of less than 2.0% molybdenum is not effective, whereas that of more than 5% molybdenum causes the precipitation of σ phase and reduces both toughness and pitting corrosion resistance of the weld metal. Accordingly, the molybdenum content was restricted in a range of 2.0 to 5.0%, and preferably 3.0 to 5.0%. Molybdenum can be used together with tungsten, as described below.

Nitrogen

Nitrogen is an important element that suppresses formation of the ferrite phase and increases a pitting corrosion resistance. However, less than 0.10% nitrogen content is not fully effective. On the other hand, as the nitrogen content increases, the welding defects, such as blowholes are apt to be produced and the soundness of the weld metal is reduced. The welding material of this invention is designed not to cause any welding defects, in all welding positions, by defining the upper limit of the nitrogen content to 0.24%.

Cobalt

Cobalt is an optional element, which is not necessarily added to the welding material. Cobalt exhibits a behavior similar to that of nickel, but the degree of producing σ phase is low, as compared with the case of nickel, during welding operations. Accordingly, a part of nickel can be replaced by cobalt. However, cobalt is more expensive than nickel, therefore, when it is used, the upper limit of the cobalt content should be 3.0%.

Tungsten

Similar to molybdenum, tungsten is an element that increases resistance to corrosion, in particular pitting corrosion and intergranular corrosion, and forms a stable oxide, which serves to maintain improved pitting corrosion resistance of the steel, even in a low pH environment. Accordingly, even in a case in which chromium content and nitrogen content are low, the addition of tungsten is able to increase the pitting resistance equivalent (PREW), as is molybdenum. However, if tungsten content exceeds 5.0%, a precipitation of another intermetallic compound (Laves phase) is accelerated and both toughness and pitting corrosion resistance are reduced.

Although tungsten is not an indispensable element, it can be added optionally to the welding material because it has the above-mentioned preferable effects. When it is added, the content should be not more than 5.0%, preferably 1.0 to 5 0%.

Copper

Copper is an element which improves corrosion resistance, in particular, resistance to sulfuric acid or the like, and can be optionally added to the welding material, as vanadium, if necessary.

Copper improves the corrosion resistance in a reducing environment of low pH, for example, an environment containing $H_2SO_4$ or hydrosulfide. Since more than 2.0% of copper lowers the toughness of the weld metal, the copper content should be not more than 2.0%. However, more than 0.2% copper content is necessary to obtain a sufficient improvement on the corrosion resistance.

Vanadium

Vanadium improves the crevice corrosion resistance in cooperation with tungsten, if both elements are added to the welding material. Since less than 0.05% vanadium is not so effective, not less than 0.05% vanadium content is required in case of the optional addition of it. However, more than 1.50% vanadium increases an amount of ferrite phase and lowers the toughness and corrosion resistance of the weld metal.

In order to improve pitting corrosion resistance and toughness of the weld metal, the welding material of this invention is further restricted, such that the pitting resistance equivalent (PREW) of foregoing formula ① is higher than 42.0, and the ferrite volume index (Ph) of foregoing formula ② ranges from 0.12 to 0.25, in addition to the foregoing restrictions of the chemical composition.

Pitting Resistance Equivalent (PREW)

Several pitting resistance equivalents have been heretofore proposed as an index to evaluate pitting corrosion resistance of the duplex stainless steel. In this invention, the pitting resistance equivalent (PREW) of aforesaid formula ①, which includes W (tungsten content) as a factor, is used. The equivalent has been proposed by the applicant of this application, and disclosed in Japanese Patent Application No.7-60523 (Japanese Patent Public Disclosure No.8-260101). If this PREW value is 42.0 or more, extremely excellent pitting corrosion resistance can be obtained.

Ferrite Volume Index (Ph)

The pitting corrosion resistance of the duplex stainless steel is improved by the function of alloying element of chromium, molybdenum, tungsten and nitrogen, as above mentioned. The duplex stainless steel naturally consists of a mixture of a ferrite phase and an austenite phase, wherein any of these elements are distributed in either phase with different distribution ratios. The concentration of chromium, molybdenum and tungsten in the ferrite phase is relatively higher than that in the austenite phase, whereas that of nitrogen in the ferrite phase is relatively lower than that in the austenite phase.

In order to suppress a production of blowholes, nitrogen content of the welding material of this invention is as little as possible. Accordingly, if the austenite to ferrite ratio becomes too high, nitrogen content in the austenite phase becomes small, and pitting corrosion resistance of the austenite phase is reduced. Mechanical strength of the weld metal is also reduced. In other words, the super duplex stainless steel, similar to the welding material of this invention, with relatively low nitrogen content, is required to lower its austenite to ferrite ratio. For this purpose, the ferrite volume index (Ph) is restricted to not more than 0.25. However, if the ferrite volume index (Ph) is below 0.12, the ferrite phase ratio becomes too high, and the corrosion resistance and toughness are reduced. Therefore, the ferrite volume index (Ph) should be controlled in a range of 0.12 to 0.25.

EXAMPLE 1

Figure 1:
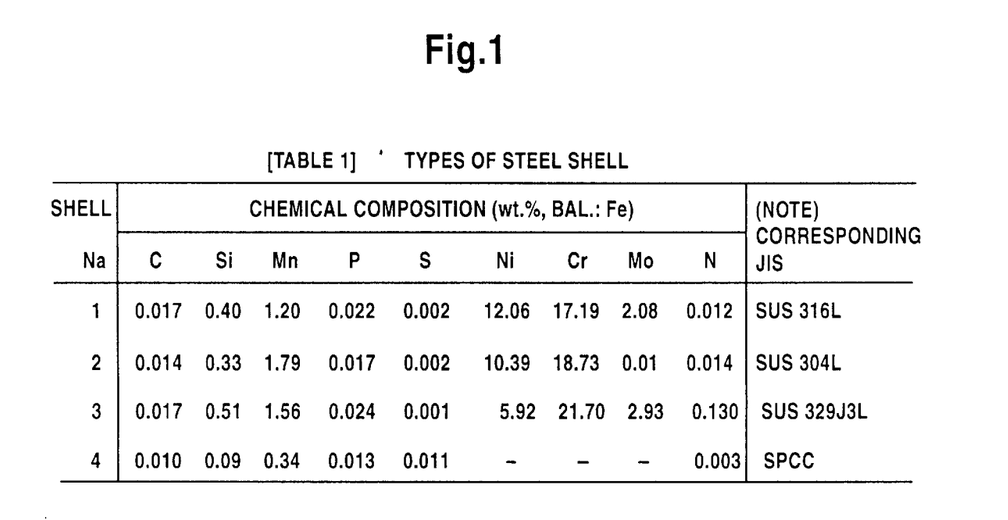
FIG. 1 is a Table showing chemical compositions of steel shells for composite wires used in examples.

A series of composite welding wires with the chemical compositions, as shown in FIG. 2, were produced by using four types of shell steels, with the chemical compositions as shown in FIG. 1. The content of each alloying element in the composite wire was calculated by the foregoing formula ③. The filler material was composed of a powder with the grain size of not larger than about 150 μm, and the filling ratio was 20 to 50%. The thickness of the shell was 0.4 to 0.8 mm, and the diameter of the composite wire was 1.2 mm, as a whole. As all the steels of the shell were excellent in workability, the composite welding wires were easily manufactured with them.

Figure 3:
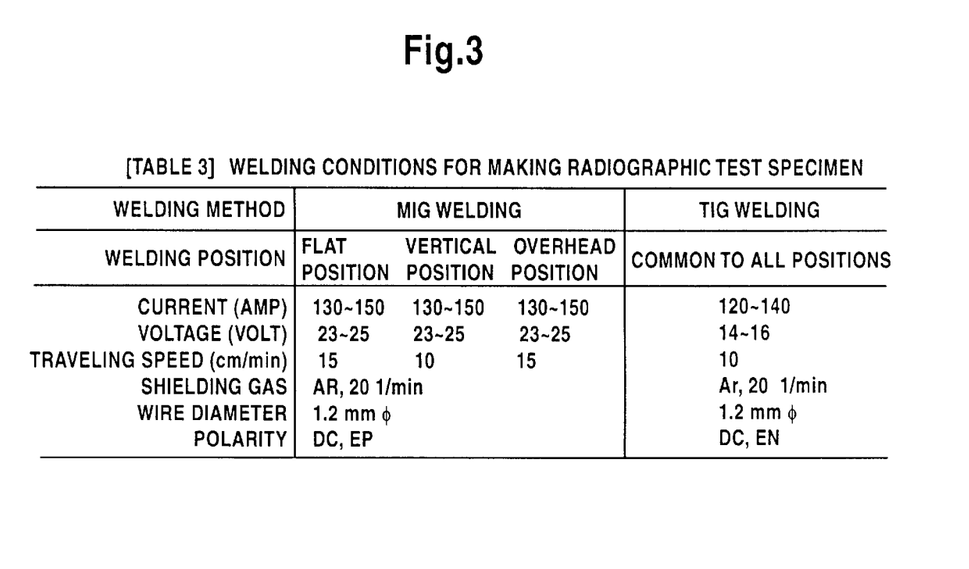
FIG. 3 is a table showing welding conditions for making a radiographic test specimen used in examining blowholes in the weld metal.

Using these composite welding wires, a series of welding tests were carried out under conditions, as shown in FIG. 3, by TIG and MIG welding methods in various welding positions. Then all test specimens, after welding tests, were subjected to a radiographic test for detecting blowholes.

Figure 4:
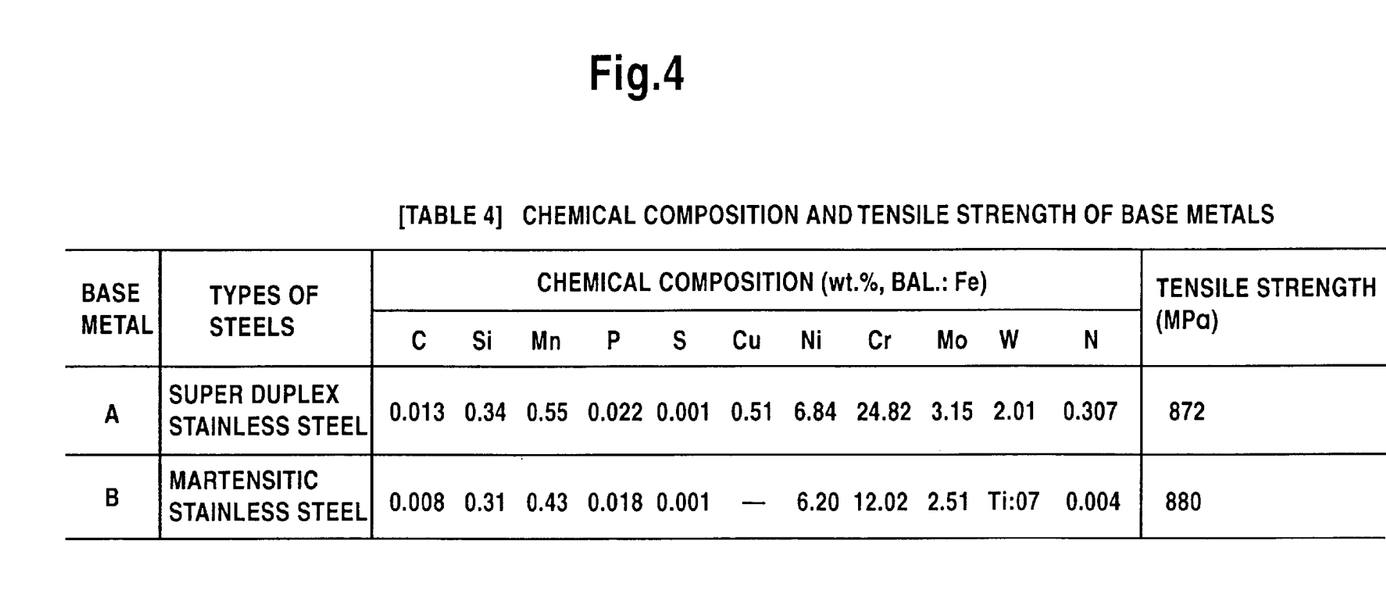
FIG. 4 is a table showing chemical compositions of base metals used in the examples.
Figure 12:
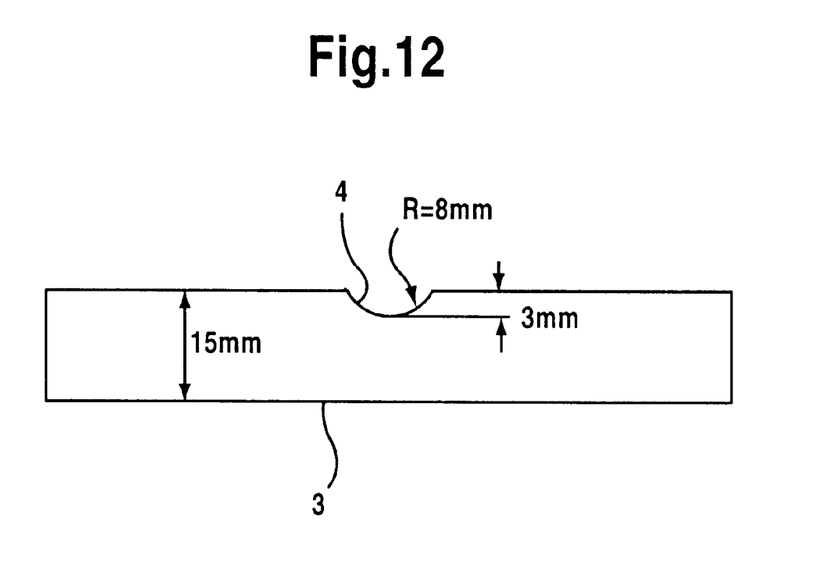
FIG. 12 is a side view of a base metal to be welded into a radiographic test specimen for detecting blowholes.

In the foregoing welding tests, a base metal plate 3, having a groove 4 formed thereon as shown in FIG. 12, was subjected to a welding operation for making a single pass bead on said groove in flat, vertical and overhead positions. The base metal plate 3 (the plate to be welded) was a plate (thickness: 15 mm) of "base metal A (super duplex stainless steel)" whose composition and tensile strength are shown in FIG. 4. In the radiographic test, the welding defects of Type 1, which is defined in "types of defects" of Table 6 in JIS Z 3106, were examined. When the said defects belong to "grade 1" in Table 12 of the same JIS number, the specimens were evaluated as "qualified" and others were not. The test results are shown in FIG. 5.

Figure 5:
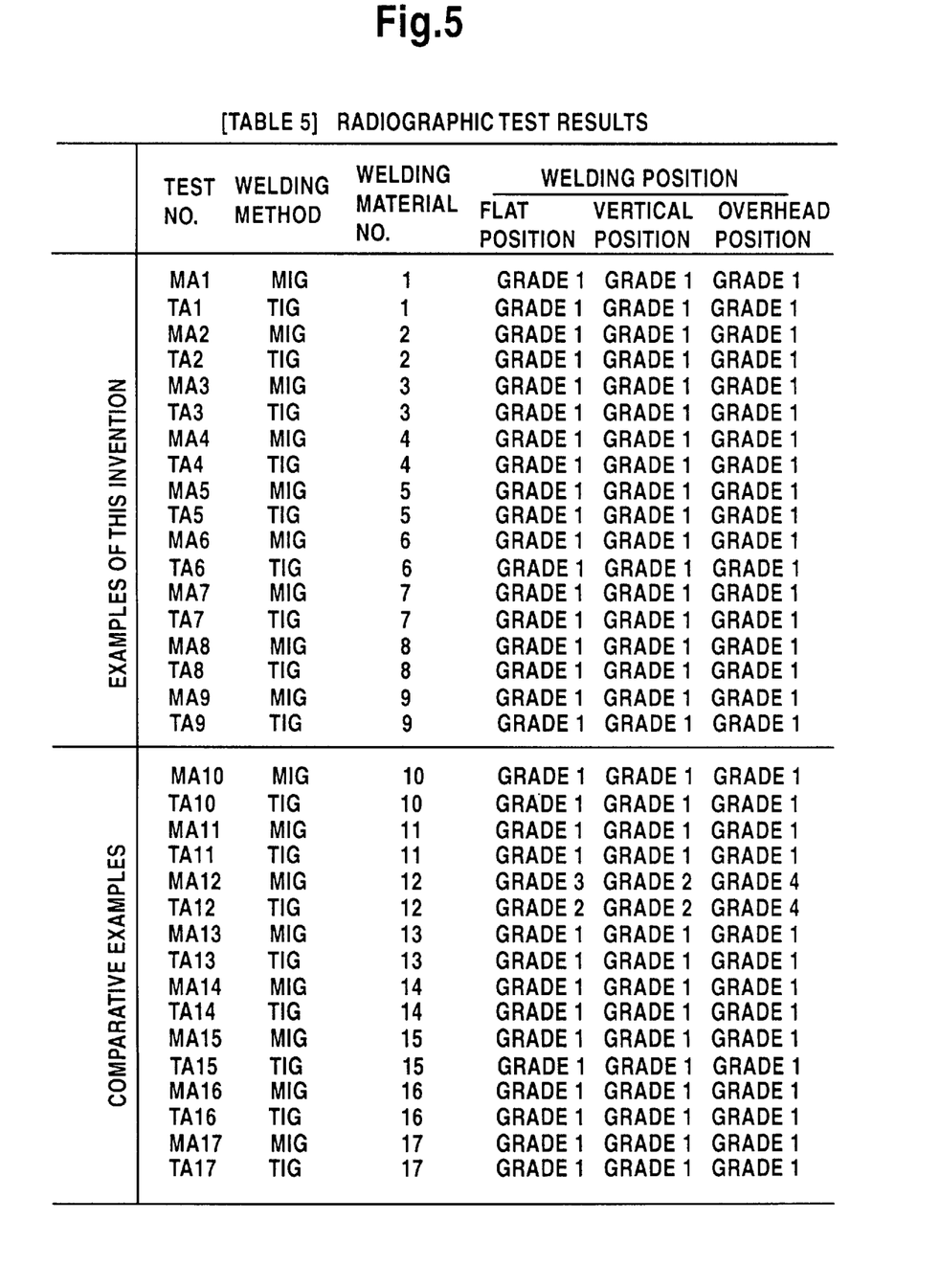
FIG. 5 is a table showing results of the radiographic test.

It is apparent from FIG. 5, that in a case of using the welding materials of this invention (No.1 to No.9, in FIG. 2), the weld metal of "grade 1" can be obtained by either TIG or MIG in all welding positions. On the other hand, in the tests No.MA12 and TA12, in which the welding material of high nitrogen content of 0.27% (No.12 in FIG. 2) was used, many blowholes were found in the weld metal, and the specimens could not be qualified.

EXAMPLE 2

Figure 6:
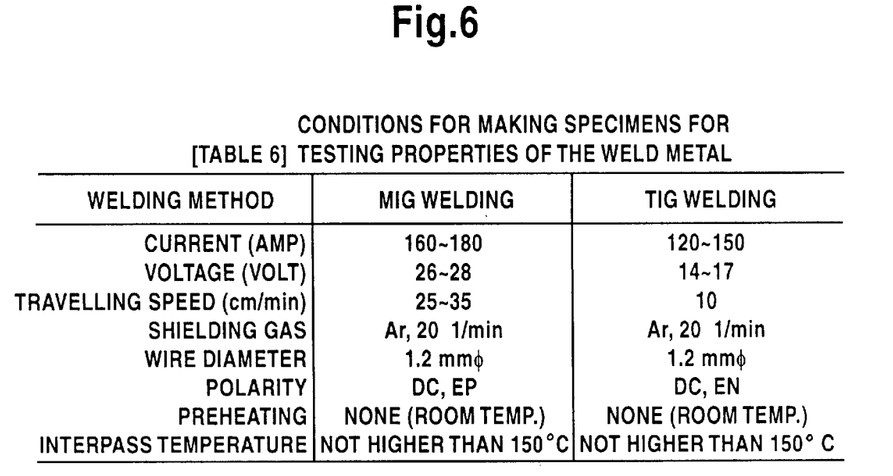
FIG. 6 is a table showing welding conditions for making test specimens used in examining properties of the weld metal.
Figure 13:
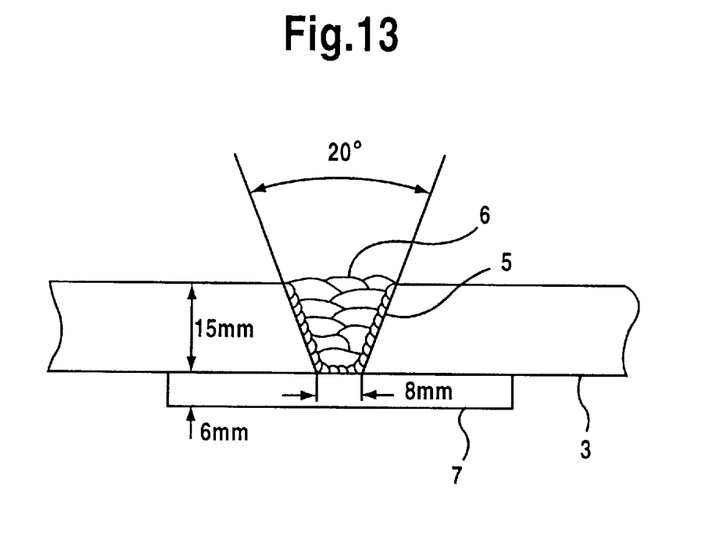
FIG. 13 is an illustration showing specifications for making a test specimen for examining properties of weld joints.

Weld metals were produced in the following steps in order to evaluate their properties. Plates (thickness:15 mm) of either super duplex stainless steel (base metal A) or martensitic stainless steel (base metal B) were prepared. A groove, whose shape and dimension were given in FIG. 13, was formed in the base metal, and a backing metal 7 was padded on the back of the base metal. The inner groove surface was first subjected to a buttering, in order to form two surface layers 5, using the welding material shown in FIG. 2, and then subjected to a multiple pass welding to form a joint, having a multilayered weld metal 6, under welding conditions shown in FIG. 6, and using the same welding material as that of the buttering.

Figure 8:
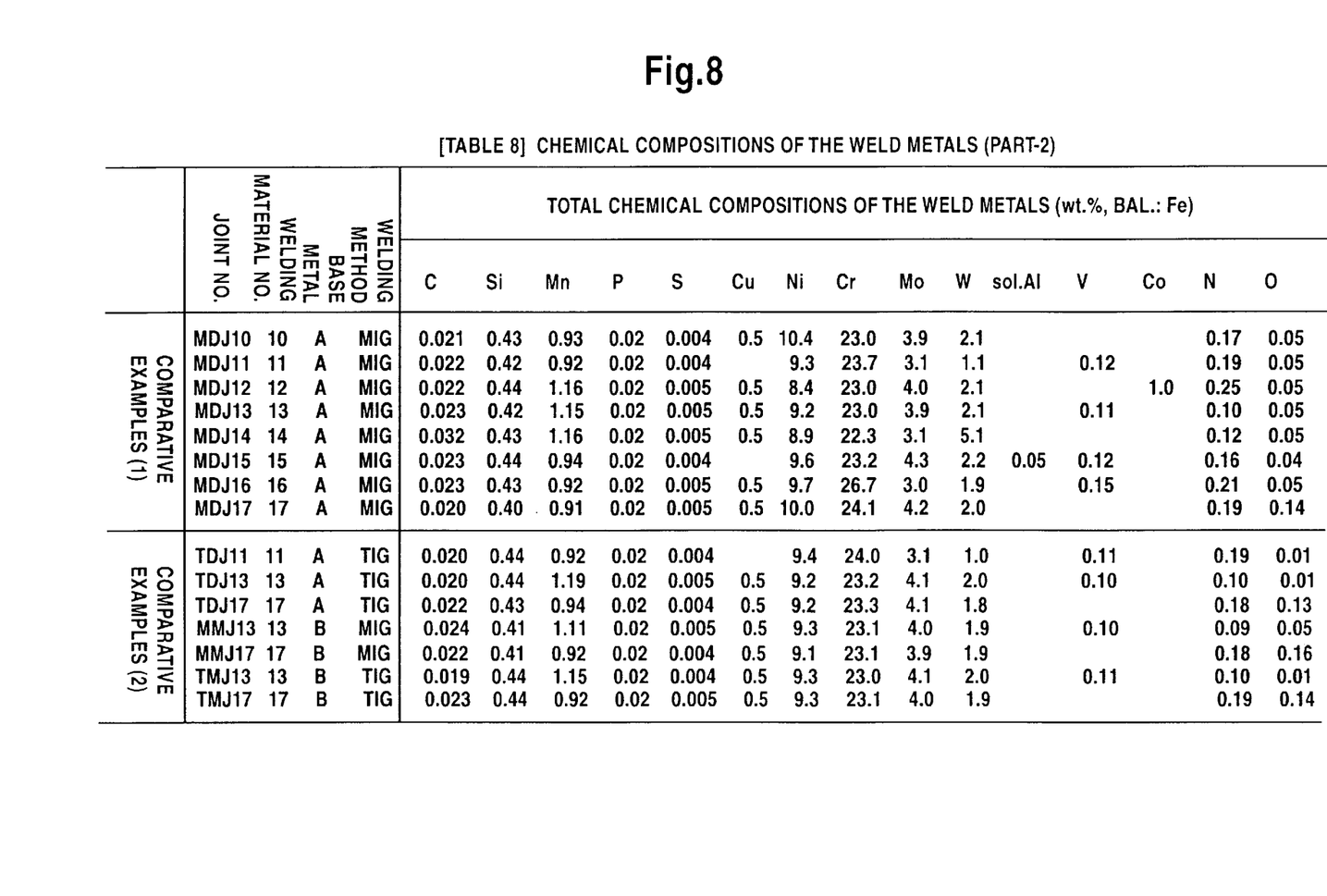
FIG. 8 is a table showing chemical compositions of the weld metals made of welding materials of comparative examples shown in the FIG. 2.

Compositions of the weld metals in the welded joints are shown in FIG. 7 and FIG. 8. The examples of joints of this invention ① shown in FIG. 7 were made by welding the base metals A with the welding materials No.1 to 9, by means of MIG; whereas the examples of joints of this invention ② shown in FIG. 7 were made by welding the base metals A or B with the welding materials of No.1, 4 or 9, by means of MIG or TIG. The comparative examples of joints ① shown in FIG. 8 were made by welding the base metals A with the welding materials No.10 to 17, by means of MIG; whereas the Comparative examples of joints ②, shown in FIG. 8, were made by welding the base metals A or B with the welding materials of No.11, 13 or 17, by means of MIG or TIG in various combinations.

Figure 14A:
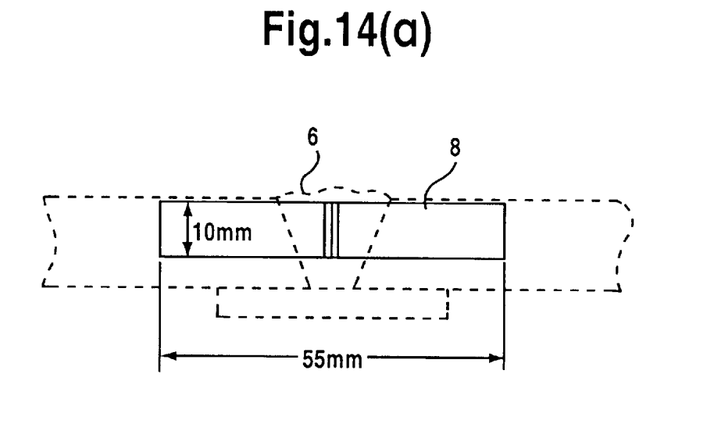
Figure 14B:
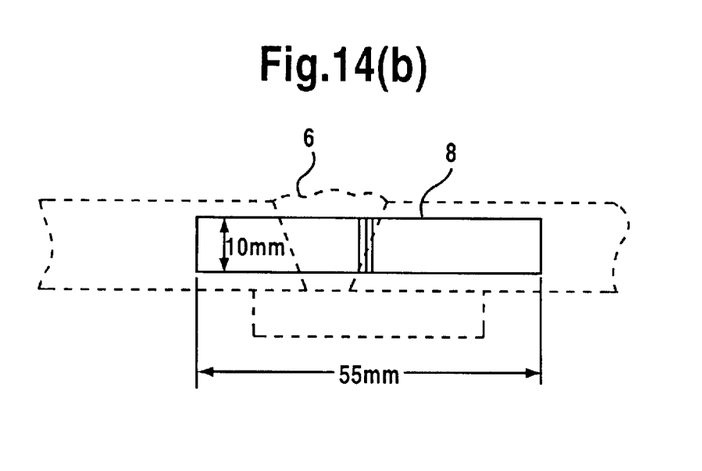
Figure 15A:
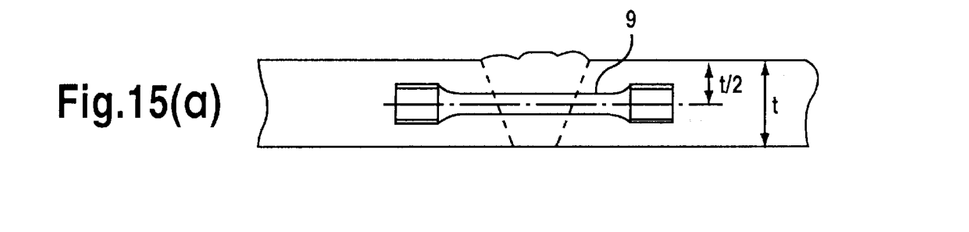
Figure 15B:
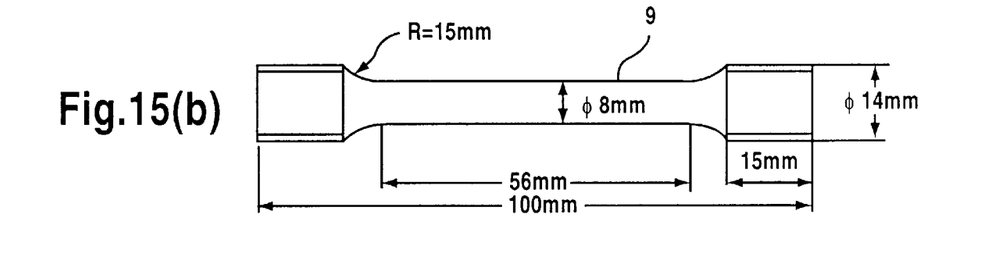
Figure 15C:
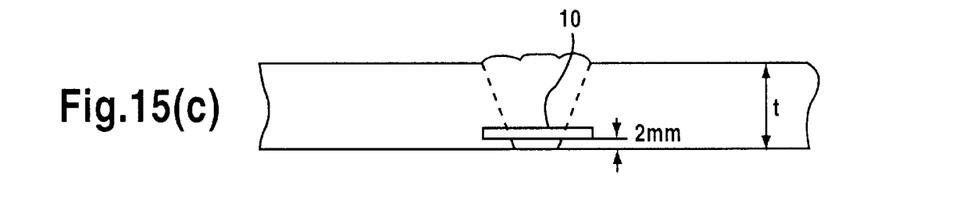
Figure 15D:
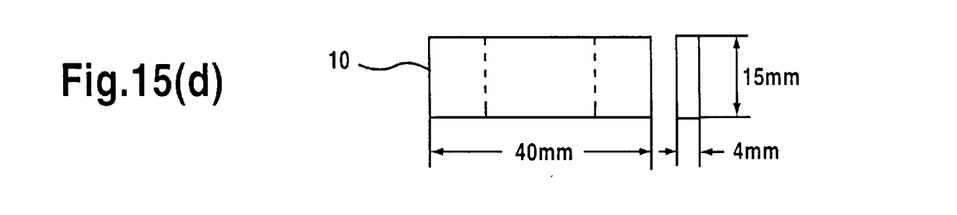
Figure 15E:
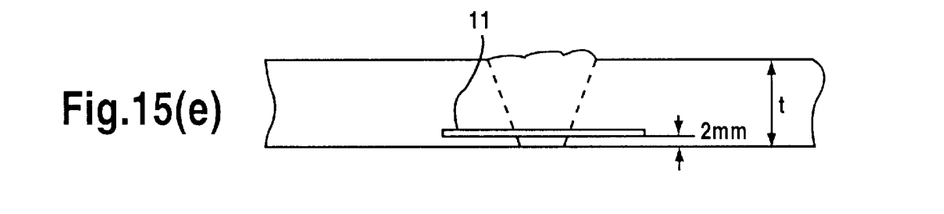
Figure 15F:
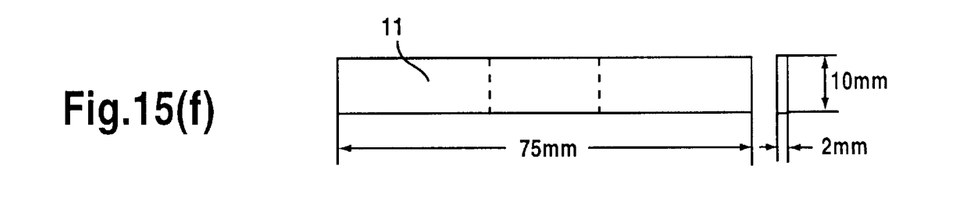

Charpy impact test specimens (according to JIS Z 2202 type 4) 8 were produced from welding joints by machining, as shown in FIG. 14(*a*) and FIG. 14(*b*). One specimen has the notch located in the center of the weld metal, as shown in FIG. 14(*a*), while the other specimen has the notch nearly located on the fusion line, as shown in FIG. 14(*b*) A round bar tensile test specimen (according to JIS Z 2201 type 14) 9 is also produced by machining from the welded portion of the joint, as shown in FIG. 15(*a*).

In order to confirm the corrosion resistance of the base metals A and B in a practical environment, a pitting corrosion resistance test specimen 10, having a shape shown in FIG. 15(*d*), was produced by machining from the welded portion of the joint of the base metal A, as shown in FIG. 15(*c*), and then subjected to the pitting corrosion resistance test. Similarly, a four-point bending test specimen 11, having a shape shown in FIG. 15(*f*), was produced by machining from the weld portion of the joint of the base metal A, as shown in FIG. 15(*e*), and then subjected to the sulfide stress corrosion cracking (SSC) resistance test.

Charpy impact test was carried out at a temperature of −30° C. and any specimen which exhibited the impact value not lower than 80 J/cm² was evaluated to be qualified. The 80 J/cm² can be considered enough for practical use. Tensile test was carried out at room temperature, and any specimen that fractured in the base metal was evaluated to be qualified.

In the pitting corrosion resistance test, a test specimen was dipped in a 6% $FeCl_3$ aqueous solution kept at 50° C. for 24 hours, and pitting was visually examined. Specimens without any pitting were evaluated to be qualified.

In the sulfide stress corrosion cracking test, the abovementioned four-point bending test specimen was subjected to a bending stress, which corresponds to the proof stress of the base metal of martensitic stainless steel, and then dipped in a 5% NaCl aqueous solution (containing $H_2S$ of 0.001 MPa partial pressure, and $CO_2$ of 3 MPa partial pressure) kept at 150° C. in an autoclave for 720 hours. Crack generation was examined by a visual inspection of the fracture surface. Any specimen without crack generation was evaluated to be qualified.

Figure 9:
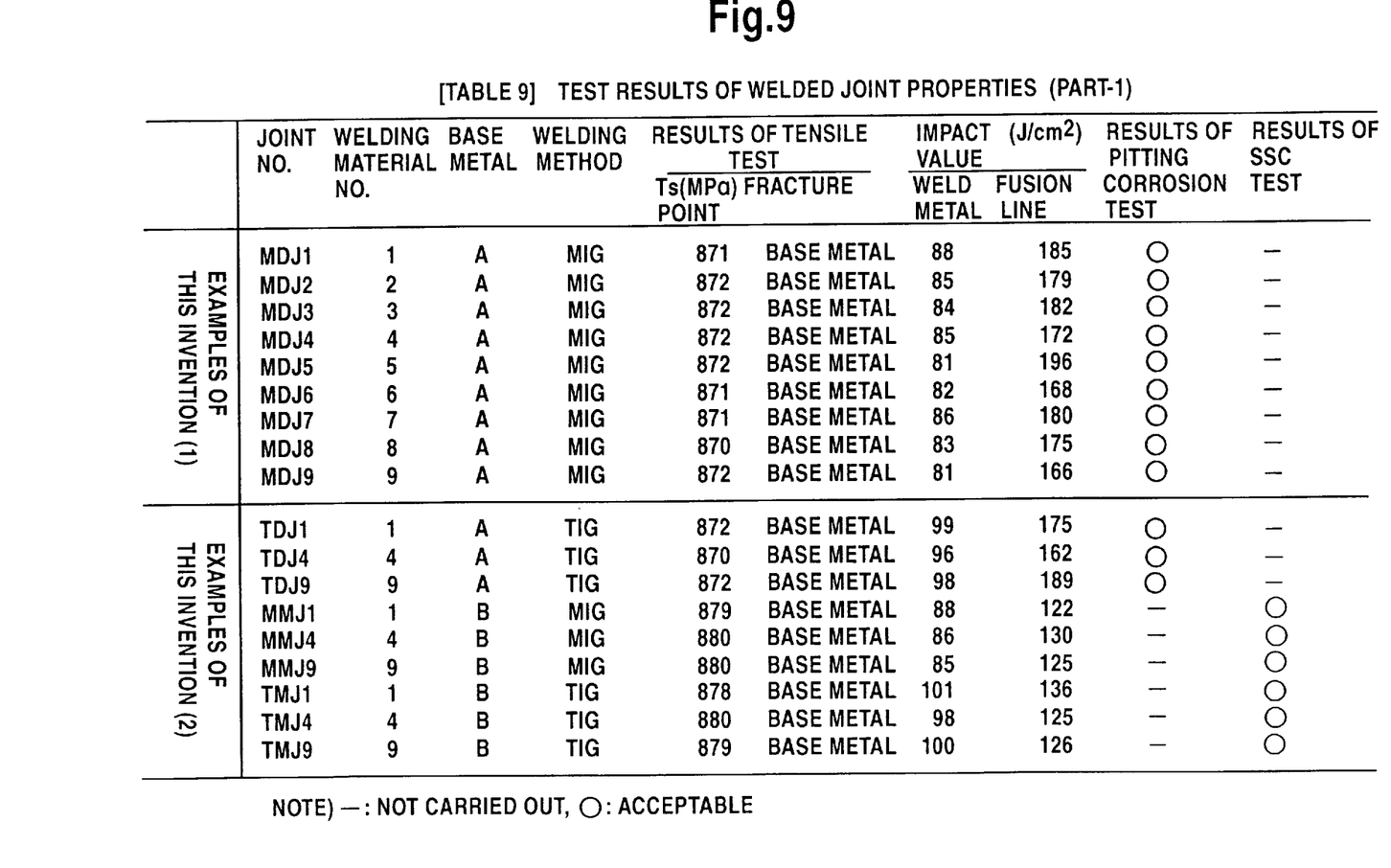
FIG. 9 is a table showing results of various tests for the examples of this invention shown in the FIG. 7.
Figure 10:
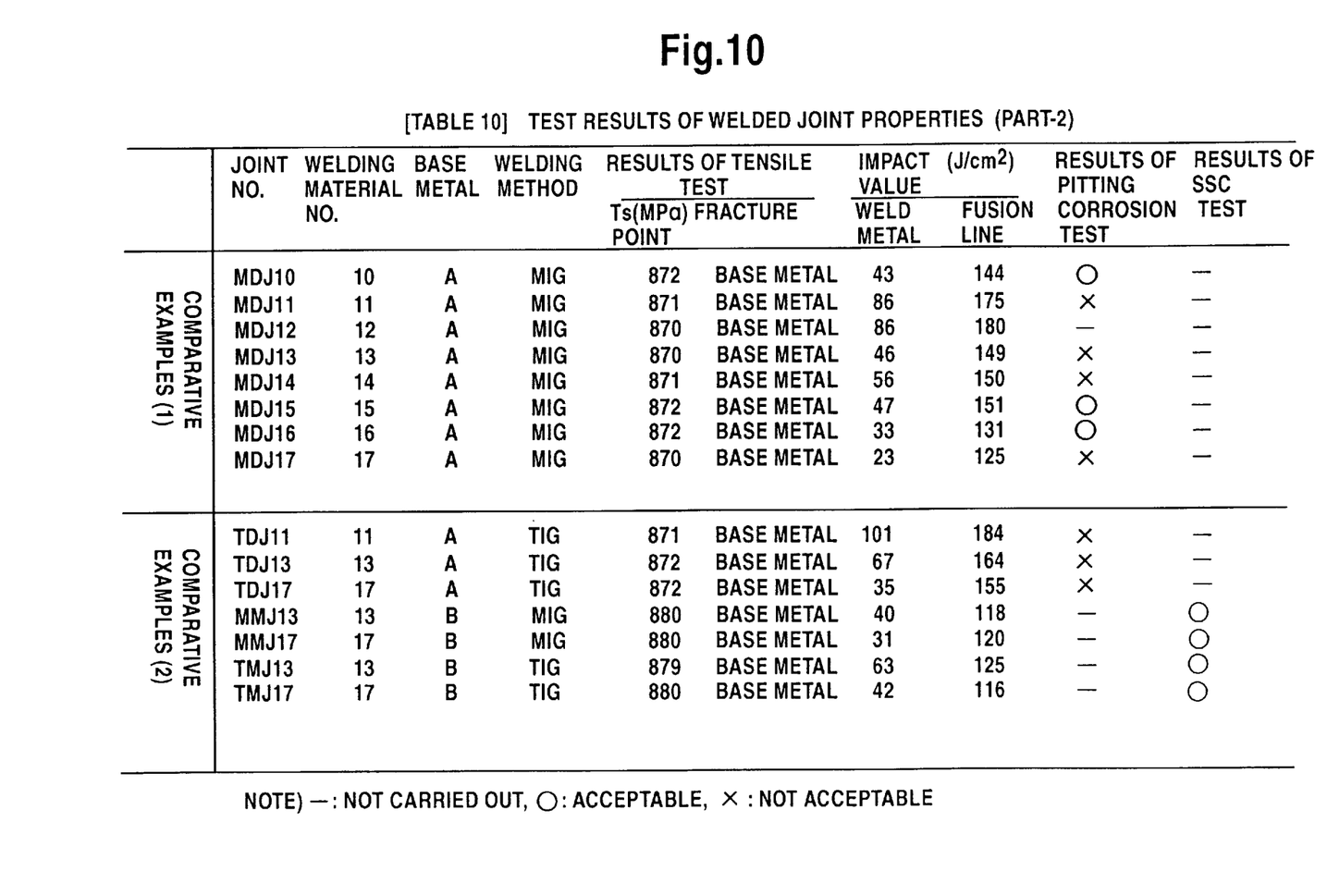
FIG. 10 is a Table showing results of various tests for the comparative examples shown in the FIG. 8.

Results of tests for properties of welded joint are shown in FIG. 9 and FIG. 10.

It is apparent from FIG. 9 that the joints, which were made using the welding material of this invention (No.1 to 9) have high strength and toughness. The pitting corrosion resistance of the joint of the base metal A (super duplex stainless steel), and the sulfide stress corrosion cracking resistance of the joint of the base metal B attained the respective passing level.

On the contrary, all the joints, which were made using the welding materials of the comparative examples, had some defects as shown in FIG. 9. For example, the joint MDJ10, which was made using welding material No.10 containing large amounts of nickel (10.5%), exhibited a low impact value. Pitting was observed in the joints MDJ11 and TDJ11, which wore made using welding material No.11, which has very low pitting resistance equivalent (PREW) of 39.7. Since many blowholes were observed in the weld metal of the joint MDJ12, which was made using the welding material No.12, its pitting corrosion resistance was not examined.

Too much ferrite phase was formed in the weld metals of the joints MDJ13, TDJ13, MMJ13 and TMJ13, which were made using the welding material No.13, whose ferrite volume index (Ph) was as low as 0.06. For this reason pitting was observed in the weld metal and its impact value was not enough. Since the Ph value of the welding material No.14 was low, the joint MDJ14, which was made using it, could not exhibit sufficient pitting corrosion resistance and toughness.

The joint MDJ15, which was made using the welding material No.15, containing chromium as high as 27.1%, exhibited a low impact value. The joint MDJ16, which was made using the welding material No.16, containing aluminum as high as 0.58%, also exhibited a low impact value.

The welding material 17, wherein some slag forming agent was added to the filler material, contained large amounts of Oxygen (O), as shown in FIG. 2. Since plenty of inclusions, mainly consisting of oxides, were entrapped in every weld metal of the joints MDJ17, TDJ17, MMJ17 and TMJ17, which were made using the welding material 17, toughness and pitting corrosion resistance of these joints were inferior.

INDUSTRIAL APPLICABILITY

It is apparent, from the test results shown in FIG. 5, FIG. 9 and FIG. 10, that a sound weld metal without blowholes can be obtained using the welding material (composite welding wire) of this invention, with a base metal of either duplex stainless steel or martensitic stainless steel, and with either TIG or MIG welding method.

The welded joint including the said weld metal exhibits high strength and toughness, and excellent corrosion resistance (pitting corrosion resistance, sulfide stress corrosion cracking resistance). Since such welding material contains alloying elements such as chromium, molybdenum, tungsten, all of which improve the pitting corrosion resistance with an appropriate balance, it is applicable to welding the super duplex stainless steel of a higher grade as compared with the convention al duplex stainless steel. In addition, the welding material of this invention can be easily produced because it is a composite cored wire.

We claim:

1. A composite wire welding material for use in welding stainless steels, composed of a steel shell and a filler material enveloped by the said steel shell and not containing slag forming agent, characterized in that:

said welding material, as a whole of the steel shell and filler material enveloped therein, consists of not more than 0.03% C, not more than 1.0% Si, not more than 1.5% Mn, not more than 0.04% P, not more than 0.01% S, not more than 0.5% Al, 8.0 to 10.0% Ni, 22.0 to 26.0% Cr, 2.0 to 5.0% Mo, 0.12 to 0.24% N, not more than 3.0% Co, not more than 5.0% W, not more than 2.0% Cu, not more than 1.50% V and the balance being Fe and incidental impurities;

pitting resistance equivalent PREW of the said welding material is not smaller than 42.0 and ferrite volume index Ph of said welding material is 0.12 to 0.25, in which PREW and Ph are defined by the following formula ① and formula ② respectively:

$$PREW = Cr + 3.3(Mo + 0.5W) + 16N \qquad ①$$

$$Ph = \frac{Ni + 30(C + N) - 0.6(Cr + 1.5Si + Mo + 0.4W) + 5.6}{Cr + 1.5Si + Mo + 0.4W - 6} \qquad ②$$

wherein each symbol of an element indicates the content (weight %) of the element.

2. A welding material according to claim 1 for a gas shield arc welding of stainless steels.

3. A welding material according to claim 1 for a gas shield arc welding of martensitic stainless steels.

4. A welding material according to claim 1 for a gas shield arc welding of duplex stainless steels consisting essentially of austenite and ferrite.

5. A composite wire welding material for use in MIG welding of duplex stainless steels, composed of a steel shell and a filler material enveloped by said steel shell and not containing slag forming agent, characterized in that:

said welding material, as a whole of the steel shell and filler material enveloped therein, consists of not more than 0.03% C, not more than 1.0% Si, not more than 1.5% Mn, not more than 0.04% P, not more than 0.01% S, not more than 0.5% Al, 8.0 to 10.0% Ni, 22.0 to 26.0% Cr, 2.0 to 5.0% Mo, 0.12 to 0.24% N, not more than 3.0% Co, not more than 5.0% W, not more than 2.0% Cu, not more than 1.50% V and the balance being Fe and incidental impurities;

pitting resistance equivalent PREW of the said welding material is not smaller than 42.0 and ferrite volume index Ph of the said welding material is 0.12 to 0.25, in which PREW and Ph are defined by the following formula ① and formula ② respectively:

$$PREW = Cr + 3.3(Mo + 0.5W) + 16N \qquad ①$$

$$Ph = \frac{Ni + 30(C + N) - 0.6(Cr + 1.5Si + Mo + 0.4W) + 5.6}{Cr + 1.5Si + Mo + 0.4W - 6} \qquad ②$$

wherein each symbol of an element indicates the content (weight %) of the element.

* * * * *